United States Patent [19]

Reid

[11] Patent Number: 4,690,698

[45] Date of Patent: Sep. 1, 1987

[54] ABSOLUTE SEPARATOR

[76] Inventor: Laurance S. Reid, 601 Broad La., Norman, Okla. 73069

[21] Appl. No.: 878,370

[22] Filed: Jun. 25, 1986

[51] Int. Cl.⁴ ............................................. B01D 47/00
[52] U.S. Cl. ........................................... 55/89; 55/90; 55/93
[58] Field of Search ................................ 55/89, 90, 93

[56] References Cited

U.S. PATENT DOCUMENTS

| | | | |
|---|---|---|---|
| 1,405,154 | 1/1922 | Paris, Jr. ............................ | 55/89 X |
| 2,074,644 | 3/1937 | Drennan ............................ | 55/89 X |
| 2,117,548 | 5/1938 | Drennan ............................ | 55/93 X |
| 2,335,855 | 12/1943 | Hall .................................... | 55/93 X |
| 2,355,588 | 8/1944 | Brandt ............................... | 55/93 X |
| 3,232,027 | 2/1966 | Lorenz et al. ..................... | 55/93 X |
| 3,528,220 | 9/1970 | Warner et al. ..................... | 55/89 |
| 3,594,985 | 7/1971 | Ameen et al. ..................... | 55/93 X |
| 3,681,897 | 8/1972 | Mitchell et al. .................... | 55/93 X |
| 4,054,429 | 10/1977 | Ostojic et al. ..................... | 55/93 X |

FOREIGN PATENT DOCUMENTS 18475   2/1977   Japan ..................... 55/90

*Primary Examiner*—Kathleen J. Prunner
*Attorney, Agent, or Firm*—Mason, Kolehmainen, Rathburn & Wyss

[57] ABSTRACT

A method of removing low vapor pressure liquid contaminants, including polychlorinated biphenyls, from flowing gas streams. The gas stream is directed through a series of distinct gas-liquid separation stages, with each stage constructed to physically remove successively smaller concentrations of liquid contaminants from the stream. Within each stage, the contaminants are coalesced, then collected in a suitable solvent, present in sufficient quantity to preclude re-entrance of the contaminant into the flow system.

16 Claims, 2 Drawing Figures

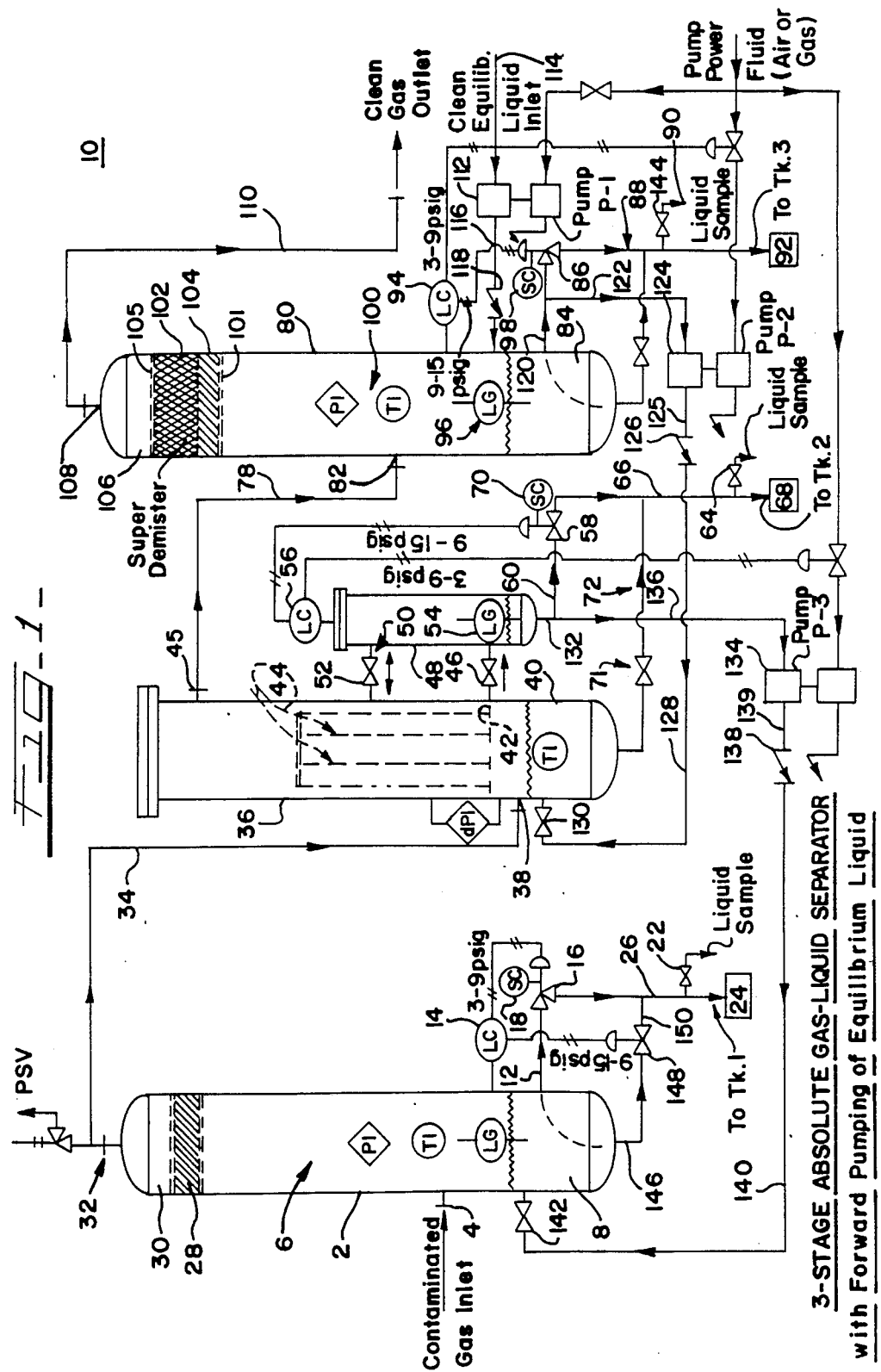

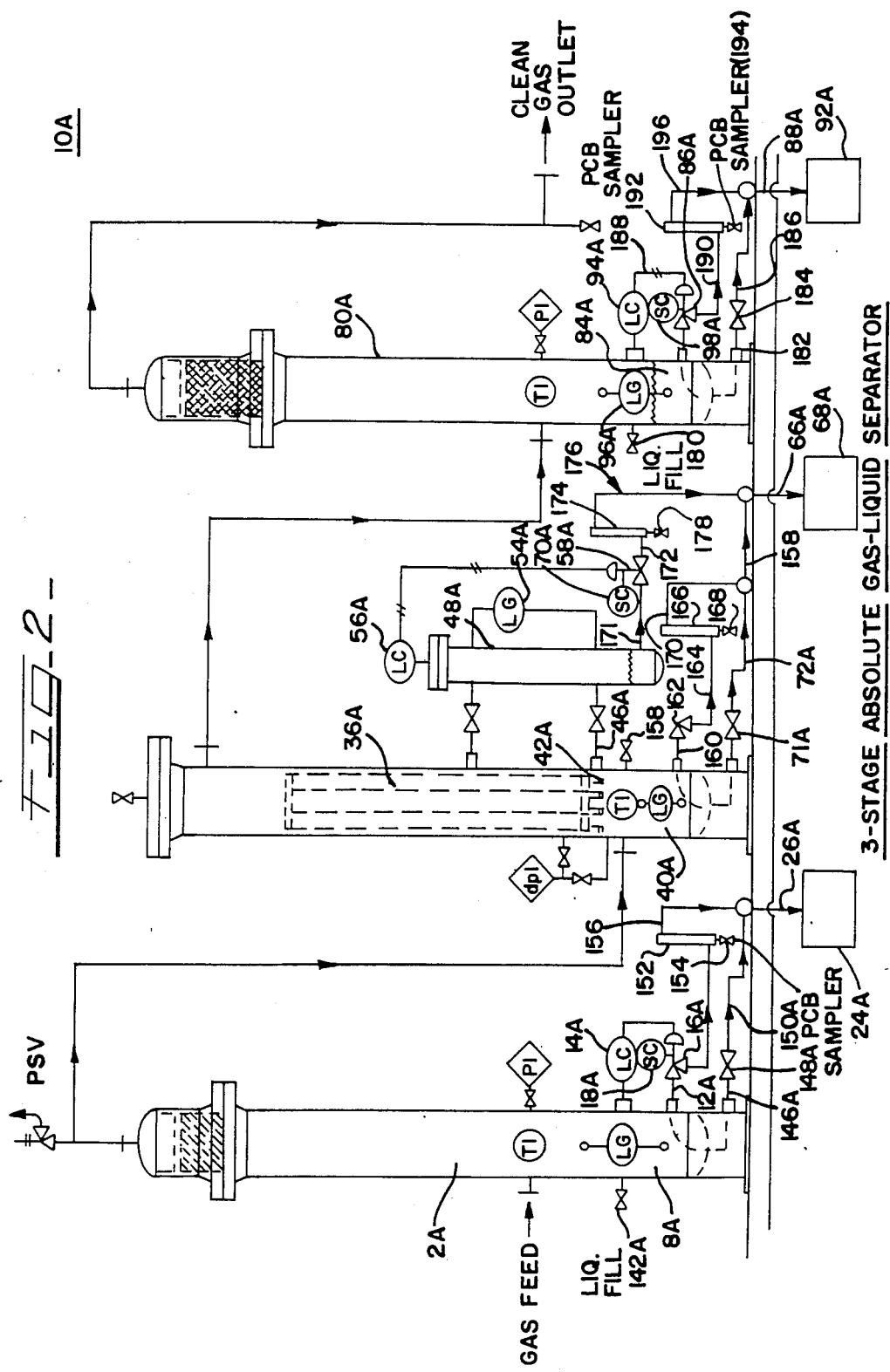

ABSOLUTE SEPARATOR

FIELD OF THE INVENTION

The present invention relates to a method of removing low vapor pressure, film-forming liquid contaminants, including polychlorinated biphenyls, from flowing gas streams. More particularly, the process of the present invention includes directing the gas stream through a three-stage treatment, wherein each stage is constructed to separate and collect liquid contaminants in successively smaller concentrations to finally provide a gas stream free of liquid contaminants. The new and unexpected absolute separation of such contaminants, such as polychlorinated biphenyls (PCBs), is a result of the ability of the multi-stage gas-liquid separation to essentially completely remove liquid contaminants from flowing gas and the collection of the contaminants in a greater than equilibrium amount of a compatible solvent, thereby precluding the contaminants' re-entry into the flow system.

BACKGROUND OF THE INVENTION AND PRIOR ART

The presence of liquid contaminants in flowing gas streams poses a serious problem if the contaminating substance renders the gas unfit for use or unfit for storage. If the contaminant is toxic or polluting, such as polychlorinated biphenyls, it is necessary to remove the contaminant almost entirely (less than 50 parts per million or ppm in gas or any associated liquid) to yield a usable and non-polluting gas product.

Of particular interest are natural gas transmission lines contaminated with polychlorinated biphenyls (PCBs). The presence of PCBs in natural gas transmission lines is especially troublesome since PCBs, in addition to being among the most degradation resistant compounds known, have shown chronic effects, including carcinogenicity, in many living species. These chronic effects have been observed at very low PCB exposure levels, and therefore PCBs have been declared a general threat to the environment by appropriate government agencies. Although PCB production is now banned, PCBs, due to their inherent superb dielectric properties, remain in use as fluid insulators for power transformers. The transformers are totally enclosed, therefore the PCBs are isolated from contact with the environment. Of an estimated total production of 2.5 billion pounds, about 1.5 billion pounds remains in electric power service. However, in addition to a high dielectric constant, PCBs also exhibit a thermal stability and a degree of lubricity making them useful as additives in extreme pressure lubricants, such as compressor oils. As a result, before the inherent toxicity of PCBs was known and before the subsequent PCB production ban, a significant amount of polychlorinated biphenyl was used in compressor lubricating oil blends. Residual lubricating oils of this type now provide a source of PCB contamination in natural gas pipelines.

Ultimately, operators of natural gas transmission lines have had utility companies and industrial users refuse delivery of PCB-contaminated natural gas, fearing perpetual PCB contamination of underground storage reservoirs and facilities. This refusal to store excess contamination-suspected natural gas supplies adversely affects pipeline operations and load factors. The customers will use contaminated gas only as needed; therefore, by not drawing from storage supplies, peak usage periods strain the pipeline's ability to supply the required gas, while lull periods may essentially shut down the pipeline. Removal of PCBs from the natural gas would allow pipeline users to store the decontaminated gas in underground reservoirs, thus providing enough available gas for peak usage periods, and allowing the storage operators to replace this reserve during low usage periods. The load factor on the pipeline would be improved, and its operation would be more efficient.

Routine attempts are made to remove condensed liquids from gas pipelines. However, complete separation is rarely accomplished, especially when flow rates are high and pressures are elevated, as in cross-country natural gas transmission lines having variable flows and pressures on the order of 250 to 1000 psig. Presently, liquids are removed from natural gas transmission lines by draining liquid traps or drips, manually or automatically. This method is acceptable for removal of condensed liquids unless contaminants such as PCBs are present, whereby some aerosol-sized mists of extremely low mass continue to flow with the gas stream.

Total removal of liquids, including aerosol-sized liquid contaminants from gas streams, can be accomplished by adsorption of the liquid contaminants onto the surface of a highly porous solid. After saturation with liquid contaminant, the adsorbent can be replaced or heat-regenerated. The inherent disadvantage of this method is the entire system must be temporarily closed to effect adsorbent replacement, or duplicate facilities are required, allowing one adsorption unit to be in operation while the other is being cleaned and regenerated. A further disadvantage is the expense of regenerating or disposing of a large volume of spent absorbent, especially if it is saturated with a highly toxic contaminant such as PCBs.

An alternate method involves chemical dechlorination of the PCB-contaminated liquid by strong reagents such as sodium oxalate, sodium glycolate or sodium naphthalene. These strong reagents strip the chlorine atoms from the polychlorinated biphenyl molecule, converting the PCB into non-toxic biphenyl. For use in natural gas transmission lines, the dechlorinating agent must be dissolved in a polar liquid, such as water or methanol, then applied to an extended surface of a porous material. This method has a disadvantage in that the porous surface must be kept moist to achieve reaction between the PCBs in the gas flow and the dechlorinating agent. In addition, a gas treated by aqueous reagents requires dehydration before its return to the pipeline. The net result of this method is generation of relatively non-toxic biphenyl—a thick liquid of pungent odor adsorbed on the extended surface. The spent adsorbent then may be discarded properly or regenerated. Although the disadvantage of duplicate facilities remains with this system, disposal of relatively non-toxic biphenyl is considerably easier and more economical than disposal of the toxic PCBs. Nevertheless, the operational use of this PCB removal method poses significant economic and logistical problems, generally due to the volume of solvent required to keep the porous surface moist during the reaction.

The process of the present invention overcomes the above-mentioned problems. In accordance with the present invention, low vapor pressure, film-forming contaminants are removed in a continuous process, from flowing gas streams to an unexpected degree. The method of this invention is especially effective in removing contaminants, such as polychlorinated biphenyls and higher molecular weight hydrocarbons containing at least ten carbon atoms, from flowing gas streams. The contaminants are essentially completely removed in a three-stage process, constructed to reduce the contaminants to successively smaller concentrations at each stage. Then, contrary to present practice and to assure complete contaminant retention and removal, the separated contaminant is collected within each stage by a relatively large amount of an intentionally added solvent that is miscible with the contaminant.

SUMMARY OF THE INVENTION

In brief, the present invention is directed to a method for removing low vapor pressure, contaminating liquids from flowing high pressure gas transmission systems. To achieve the full advantage of the present invention, a series of separation stages, with each stage designed to separate succeedingly smaller concentrations of liquid from the gas flow, provide a contaminant-free gas stream. In accordance with the present invention, the liquid contaminants to be removed are defined as any size liquid droplet capable of being carried by or entrained by a gas stream, or of forming a liquid film on the pipe wall, at the temperature, pressure and flow rate of the gas stream. Each stage serves to collect the separated liquid contaminants for collection by a diluting solvent that is miscible with the contaminants. In a continuous process, contaminant-laden solvent is removed from the system and replaced by virgin solvent. Subsequent distillation of the contaminated solvent permits recycling of the PCB-free solvent distillate through the system, and thus reduces the volume of contaminated liquid that must be treated or destroyed.

In accordance with an important feature of the present invention, a succession of separators is arranged in series to remove successively smaller concentrations of liquid contaminants from flowing gas streams. In accordance with the present invention, the flowing gas stream containing generally 50-500 ppm PCBs is reduced to less than 50 ppm PCBs in the liquid samples and usually down to less than 10 parts per billion (ppb) in gas samples. Initially, within each stage, the liquid contaminant is physically separated from the feed gas. The configuration of each stage functions to separate and coalesce the liquid contaminant for collection by a greater than equilibrium amount of an intentionally added solvent, present in a reservoir at the bottom of each stage. The combination of physical separation and collection by a greater than equilibrium amount of a miscible solvent yields a gas stream free of liquid contaminants. In the prior art, the liquid phase often is removed from the separator as it is formed, resulting in unstable and ineffective performance of the gas-liquid separators. To achieve the full advantage of the present invention, special attention is given to retaining an intentionally added solvent phase in equilibrium contact with the gas phase to afford complete removal of the contaminants. Within the vessels of each separation stage, a significant amount of a solvent is added from an external source and retained in the vessel to collect the contaminating liquid and to contact the gas and its liquid contaminant for a time sufficient to allow an equilibrium to be reached between the gas, solvent and contaminating liquid. Generally, the solvent should contain less than about 1000 ppm of the liquid contaminant to achieve a sufficient driving force to direct the contaminant into the solvent reservoir of each stage of the process of the present invention.

The added solvent is compatible and miscible with the liquid contaminant of the gas phase, generally requiring a non-polar solvent for non-polar liquid contaminants and polar solvents for polar liquid contaminants. This solvent/contaminant miscibility allows the contaminant to accumulate and concentrate in the solvent phase at the expense of the gas phase. Overall, the design of the multi-stage separation apparatus, coupled with the addition of a suitable solvent to collect and retain the contaminating liquid, results in the essentially complete removal of liquid contaminants.

Accordingly an object of the present invention is to provide a new and improved method for removing liquid contaminants from flowing gas streams.

Another object of the present invention is to provide a new and improved method for removing micronic-sized liquid aerosol contaminants from flowing gas streams.

Another object of the present invention is to provide a new and improved method for removing low vapor pressure, film-forming liquid contaminants, such as polychlorinated biphenyls, from flowing gas streams.

Another object of the present invention is to provide a new and improved method for removing liquid contaminants, such as PCBs, from a flowing gas stream by way of a multi-stage physical separation process, wherein each stage is constructed and arranged to remove succeedingly smaller concentrations of liquid contaminants from the gas stream, and condense, coalesce and collect the liquid contaminants for removal.

Still another object of the present invention is to provide a new and improved method for removing liquid contaminants, such as PCBs, from flowing gas streams by retaining a greater than equilibrium amount of a suitable solvent in contact with the flowing gas to effect complete removal of the separated liquid contaminant.

These and other objects and advantages will become apparent from the following detailed description of the invention.

BRIEF DESCRIPTION OF THE DRAWINGS

FIG. 1 is a schematic view of one embodiment of the apparatus and method of the present invention; and FIG. 2 is a schematic view of alternative apparatus showing another embodiment of the apparatus and method of the present invention.

DETAILED DESCRIPTION OF THE PREFERRED EMBODIMENTS

A preferred embodiment of the present invention is illustrated in FIG. 1, featuring a forward pumping system for the equilibrium liquid phase. In an alternative embodiment, a batch method to accomplish the separation is illustrated in FIG. 2.

Referring to FIG. 1, a new and improved method for removing aerosol-sized liquid contaminants from flowing gas streams is illustrated. The apparatus shown schematically in the drawing, generally designated by the reference numeral 10, includes a first stage primary thrust-compensated gas-liquid separator 2 capable of removing gas-entrained liquid droplets of 6 microns or larger; a second stage coalescer 36 capable of coalescing liquid particles down to 1 micron in size; and a third stage polisher 80 for removing aerosols-sized liquid droplets less than one micron in size. In accordance with an important feature of the present invention a liquid reservoir 8, 40 and 84 is present in each of the three stages, 2, 36 and 80, respectively, to effect complete removal of the separated contaminating liquid. For purposes of illustration, the method of the present invention will be described as applied to the removal of PCBs from natural gas transmission lines at relatively high pressure, i.e., 250 to 1000 psig, however the method of the present invention may be applied to a gas flow at any positive pressure.

Referring now to FIG. 1, contaminated gas enters primary separator 2 via nozzle 4. To achieve the full advantage of the present invention at least 95% of the entrained liquid is separated in the primary separation zone 6 disposed above a liquid-level within the primary separator 2. The separated liquid collects on vessel walls and descends into the liquid collection zone 8 to mix with an equilibrium liquid solvent phase maintained at a sufficient liquid level within the primary separator 6. Excess solvent is discharged via liquid outlet 12 under control of level controller 14 and motor valve 16 whose volumetric discharge is calibrated and counted by stroke counter 18 operatively connected to motor valve 16. To measure PCB concentration, a sample from the previous discharge stroke of valve 16 is collected and withdrawn from the stream via valve 22. The remainder of the liquid is discharged to a first liquid storage tank, schematically illustrated as undersized reservoir numbered 24, via line 26.

The partially cleaned gas rises through the primary separation zone 6 to a fibrous demister 28. The demister 28 removes aerosols 6 microns and larger from the upward-flowing gas stream and prevents wall crawl-by of previously separated liquid contaminants. The initially cleaned gas collects in plenum 30 and exits the primary separator 2 via nozzle 32 and conduit 34 enroute to the second gas-liquid separation stage, the coalescer 36, entering via nozzle 38.

The gas and any contaminant liquids entering the coalescer 36 via nozzle 38 are in contact with an equilibrium solvent phase introduced and collected in reservoir 40. At this point, the entering gas, with any entrained liquid, may pick up additional solvent from reservoir 40, and thereby rise as an aerosol through tube sheet 42 to one or more coalescer elements 44. The gas aerosol mixture flows from the inside to the outside of coalescer elements 44 and causes entrained liquids to collect in a homogeneous liquid film on the exterior of the tube sheet 42 as the gas exits the fibrous elements 44. This liquid flows downward on the exterior walls of the tube sheet to collect on top of a lower tube sheet flange or liquid collection trough of tube sheet 42 and the liquid exits coalescer 36 via conduit 46 to accumulator 48. This accumulator 48 is in fluid communication with coalescer 36 via valve 50 and valve 52 to equalize the pressure in both vessels 36 and 48. The gas within the coalescer elements 44 flows through the fibrous walls, aerosol-free and upward through the annular space between the walls of the vessel 36 and the coalescer elements 44 to exit the vessel 36 via nozzle 45 to the polisher 80 via line 78 and feed nozzle 82. Liquid volume in the accumulator 48 can be evaluated via liquid level gauge 54, and, under control of level controller 56 and motor valve 58, liquid is discharged from the accumulator 48 via conduit 60 and 66 to a second liquid storage tank, schematically illustrated as undersized reservoir 68. Samples of the liquid can be taken from sample valve 64. The liquid discharge from accumulator 48 can be measured using stroke counter 70 operatively connected to motor valve 58. The PCB content of the equilibrium liquid accumulated in the reservoir 40 of coalescer 36 can be determined by withdrawing a sample from the coalescer 36 via valve 71 and conduits 72 and 66, through valve 64.

Essentially liquid contaminant-free gas exits the upper surfaces of coalescer elements 44 and exits coalescer 36 by way of conduit 78, entering the polisher 80 via nozzle 82. Within the polisher 80, the gas reaches a state of equilibrium with the solvent contained in reservoir 84 where excess solvent can be discharged via motor valve 86 and conduit 88 to a third liquid storage tank, schematically illustrated as undersized reservoir 92, under control of level controller 94. Samples of liquid from the polisher 80 can be obtained at 90 through motor valve 86, conduit 88 and sampler valve 144. The liquid discharge from polisher 80 can be measured via level gauge 96 and stroke counter 98 operatively connected to motor valve 58. The gas phase rises through a central gas volume 100 disposed above the liquid reservoir 84 in polisher 80 to pass through a fibrous mist extractor 102 including a stainless steel wire mesh base supporting a 12-inch layer of knitted DACRON yarn pad reinforced with stainless steel wire knitted into the fabric. The total thickness of the pad is at least 16 inches. The pad is supported on a pad support structure 104 and structural frames 101 and 105, and is removable for inspection, cleaning, repair and/or replacement. The gas rises through the mist extractor 102 to remove the last traces of liquid contaminants. Any collected liquid, now in heavy drop form, falls from the bottom pad support 104 into the liquid reservoir 84. The totally-cleaned gas collects in plenum 106 and exits via nozzle 108 and conduit 110 to pipeline, plant or purchaser.

The presence of an equilibrium solvent phase is essential in each of the three stages to insure proper stability and separation. The composition and characteristics of the solvent depend upon the composition of the gas and the physical properties of the liquid contaminant entrained in it, such as hydrophobicity or hydrophilicity. The method of the present invention can remove liquid toxic contaminants having vapor pressure of less than 0.4 mm HG, and is particularly efective in removing liquid toxic contaminants having a vapor pressure of less than 1 mm Hg. The method of the present invention is particularly effective in removing liquid toxic contaminants having weight average molecular weight of 185 or greater A1 . The hydrophobic nature of PCBs allows refined petroleum derived liquids, such as kerosene, diesel fuel, light gas oil, or No. 2 other hydrophobic hydrocarbons having a vapor pressure of less furnace oil to be employed. Than 0.4 mm Hg at standard temperature and pressure can be used to remove the liquid toxic contaminants from the gas stream. Depending upon the flow rate of the system, the solvents may also be added to each vessel in batch fashion (FIG. 2), monitored for predetermined levels of contaminant concentration and changed when PCB concentrations build to established limits.

Should contamination be fairly heavy, e.g., 100+ ppm, it is desirable to pump the contaminated solvents upstream, from polisher 80 to coalescer 36 to primary separator 2, and finally from the primary separator 2 to contaminated solution storage, at flow rates established by good operating practice (FIG. 1). The contaminated solvent then can be collected, distilled to regenerate the solvent and concentrate the contaminants, and the PCB contaminant removed for appropriate disposal. As shown in FIG. 1, fresh, contaminant-free hydrocarbon solvent, containing no PCBs, is fed to the suction of pump 112 via conduit 114 where its pressure is increased sufficiently to deliver it through conduit 116 and check valve 118 to the liquid reservoir 84 of polisher 80. In the reservoir 84, the solvent mixes, accumulates and dilutes the PCB content of the liquid that is in equilibrium with the gas passing through the polisher 80. It should be noted that the liquid level controllers 14, 56, and 94, shown in FIG. 1, each have two pneumatic output signals. One extends only over the range of 3 to 9 psig such that when the signal pressure exceeds 9 psig, a second signal is generated to operate a second diaphragm motor over the range of 9+ to 15 psig. This arrangement serves to discharge excess solvent that, for various reasons including pump failure, may exceed the volume capacity of the forward pumping system. In this event, excess liquid is discharged, independently, to storage tanks designated 24, 68 and 92.

Referring again to FIG. 1, excess solvent is removed from polisher 80 via conduits 120 and 122 and is conveyed to a suction side of pump 124. Pump 124 discharges the solvent through conduit 125, check valve 126, conduit 128, and valve 130 to the reservoir 40 of the coalescer 36, where it mixes, accumulates and dilutes the PCB content of the liquid in coalescer 36. Excess solvent accumulating in coalescer 36 is discharged from accumulator 48 via conduits 132, 60, and 66 and motor valve 58 to storage tank 68. If the volume of solvent from accumulator 36 exceeds the capacity of pump 134. Pump 134 discharges solvent via conduits 139 and 140 and check valve 138 and valve 142 depositing solvent in the reservoir 8 of primary separator 2. The solvent in primary separator 2 mixes, accumulates and dilutes the PCB content of the liquid in equilibrium with the gas passing through the primary separator 2. As the liquid level rises in primary separator 2, excess solvent is discharged to storage tank 24 through conduit 12, motor valve 16, and conduit 26. Liquid samples may be drawn when required through sample valves 22, 64 and 144. In the event the primary separator 2 receives a larger-than-usual batch of solvent, the excess solvent also is discharged via conduit 146, motor valve 148, and conduits 150 and 26 to the first liquid storage tank 24. It is to be understood that pumps 112, 124 and 134 can be of any suitable type, including pneumatic, hydraulic, electric or internal combustion, and that they may be operated intermittently or continuously depending upon the gas flow rate and degree of gas contamination.

Solvent contaminated with PCBs may be distilled (not shown) to form a product free from PCBs, suitable for use with fresh hydrocarbon solvent makeup as a feed to polisher 80 via conduit 114, thus forming a continuous process. It is understood that the liquid residue from PCB distillation would contain the PCBs in concentrated form to be collected, and disposed of by combustion, chemical treatment or burial. In this manner, the PCB content of the contaminated gas is removed and is concentrated in storage tank 24 for processing and/or destruction as required, and the gas produced from this unique device is free from PCB contamination and is, therefore, saleable as a non-polluting product.

In another embodiment of the present invention, the solvent is added to each vessel in batch fashion (FIG. 2), wherein each stage is monitored for contaminant concentration and fresh solvent is added as required. In FIG. 2, an apparatus component that corresponds to an apparatus component shown in FIG. 1 has the same numerical designation and an "A" designation as well. In this arrangement, each separation vessel may be monitored for contaminant concentration, and, at some predetermined level, the contaminated solvent removed, and the reservoir of each vessel replenished with virgin solvent. Referring to FIG. 2, virgin solvent is added to the primary separator 2A by way of valve 142A. At a predetermined level of contaminant concentration, or when liquid accumulation in reservoir 8A of first stage 2A becomes excessive, the reservoir 8A of the primary separator 2A may be drained through conduit 146A, motor valve 148A, conduit 150A and conduit 26A directly to storage tank designated 24A. To remove excess solvent or to obtain a sample of the contaminated solvent in the reservoir 8A, solvent may be withdrawn through level controller 14A and motor valve 16A whose volumetric discharge may be calibrated and counted by operatively connected stroke counter 18A. A sample of the previous stroke may be collected and withdrawn from stream sampler 152 via valve 154, whereas the remainder of the contaminated solvent is discharged to storage tank 24A through conduits 156 and 26A. Virgin solvent is replaced as required in reservoir 8A.

Virgin solvent is added to coalescer 36A through valve 158. Contaminated solvent can be removed directly from the coalescer liquid reservoir 40A to storage tank 68A by way of valve 71A, conduits 72A, 158 and 66A. Alternatively, excess liquid from liquid reservoir 40A can be withdrawn from coalescer 36A through conduit 160, angle valve 162, conduit 164 and stream sampler 166. A sample may be taken from the stream sampler 166 through valve 168, and the remainder of the contaminated solvent is discharged to storage tank 68A through conduits 170, 158 and 66A. Likewise contaminant and solvent liquids flowing from tube sheet 42A through coalescer elements and conduit 46A to accumulator 48A can be discharged to storage tank 68A through level controller 56A, conduit 171, motor valve 58A, conduit 172, sampler 174, and conduits 176 and 66A. Samples may be removed from sampler 174 through valve 178.

The third vessel, the polisher 80A, has a contaminated solvent removal system similar to the removal system of the primary separator 2A. Virgin solvent is added to the polisher 80A through liquid fill valve 180. At a predetermined level of concentration, e.g., 1000 ppm or less, the reservoir 84A of the polisher 80A is drained through conduit 182, motor valve 184, and conduit 186 and 88A directly to storage tank 92A. To withdraw excess contaminated solvent to storage tank 92A from the reservoir 84A, solvent is withdrawn through level controller 94A, conduit 188, motor valve 86A, conduit 190, sampler 192, and conduits 196 and 88A. A sample from the last stroke of motor valve 86A can be obtained through valve 194 in fluid communication with sampler 192 to determine PCB concentration.

It is to be understood that this apparatus of FIGS. 1 and 2 can be disposed in either vertical or horizontal positions with high flow capacity favoring a horizontal position. Also, the apparatus may be designed as three separated stages with interpiping, or combined in two vessels, or grouped together as a single vessel without departing from the teachings of the present invention.

What is claimed and desired to be secured by Letters Patent of the United States is:

1. A method of continuously removing entrained liquid toxic contaminants from a gas stream comprising:

directing said liquid contaminated gas stream sequentially through a plurality of increasingly efficient gas-liquid separator vessels, each of said separator vessels containing a level of contaminant compatible solvent therein;

coalescing the liquid contaminant from said gas stream in said separator vessels into collectable droplets such that said droplets form part of said solvent in said separator vessels;

maintaining said solvent in each separator vessel in a greater than equilibrium amount disposed in direct contact with said gas stream in each of said gas-liquid separator vessels such that said coalesced liquid contaminant easily becomes part of said solvent; and replenishing said solvent in said separator vessels to maintain a sufficiently high concentration of solvent in contact with said gas stream in each separator vessel to enable essentially complete absorption of said toxic contaminants in said solvent.

2. The method of claim 1 wherein the liquid toxic contaminants have a vapor pressure of less than 0.4 mm Hg.

3. The method of claim 2 wherein the liquid contaminants have a vapor pressure of less than 0.1 mm Hg.

4. The method of claim 3 wherein the contaminants have a weight molecular weight greater than 185.

5. The method of claim 2 wherein the liquid toxic contaminant is a polychlorinated biphenyl, or an aliphatic or aromatic hydrocarbon having a molecular weight of at least 185, or mixtures thereof.

6. The method of claim 1 wherein the solvent is kerosene, diesel fuel, light gas oil or other petroleum distillate having a vapor pressure of less than 0.4 mm Hg. at standard temperature and pressure.

7. The method of claim 1 wherein the solvent is removed and replenished in a batch process at a predetermined contaminant concentration level.

8. The method of claim 1 wherein the solvent is removed and replenished in a continuous process by replenishing solvent in the final gas-liquid separator vessel and pumping said solvent into the other separation vessels countercurrent to the gas flow.

9. A method of continuously removing a liquid toxic contaminant from a gas stream comprising:

directing said contaminated gas stream into a first gas-liquid separating vessel to separate a majority of the liquid contaminant from the gas and causing the separated liquid to join a reservoir of suitable solvent disposed within a lower portion of the first gas-liquid separating vessel to form a partially cleaned gas stream;

flowing the partially cleaned gas stream, greater than 1 micron in diameter into a second gas-liquid separating vessel to remoe liquid contaminants entrained with the partially cleaned gas stream;

coalescing said liquid contaminants into droplets in the second separating vessel; and directing the coalesced droplets to a reservoir of suitable solvent disposed in constant fluid communication with the gas in sadi second gas-liquid separating vessel, and removing a further purified gas stream from said second separating vessel;

directing the further purified gas stream into a third gas-liquid separating vessel to remove any remaining liquid contaminants from the further-purified gas stream, and directing the liquid separated from the gas in the third separating vessel to a reservoir of suitable solvent situated within said third gas-liquid separating vessel; and removing and replenishing said solvent in said first, second and third gas-liquid separating vessels.

10. The method of claim 9 wherein the liquid contaminants have a vapor pressure of less than 0.4 mm Hg.

11. The method of claim 10 wherein the toxic liquid contaminants have a vapor pressure of less than 0.1 mm Hg.

12. The method of claim 11 wherein the toxic liquid contaminants have a weight average molecular weight greater than 185.

13. The method of claim 10 wherein the toxic liquid contaminant is a polychlorinated biphenyl, an aliphatic or aromatic hydrocarbon having a molecular weight of at least 185, or mixtures thereof.

14. The method of claim 10 wherein the solvent is removed and replenished in a batch process at a predetermined contaminant concentration level.

15. The method of claim 9 wherein the solvent is kerosene, diesel fuel, light gas oil or other petroleum distillate having a vapor pressure of less than 0.4 mm Hg. at standard temperature and pressure.

16. The method of claim 9 wherein the solvent is removed and replenished in a continuous process by replenishing solvent in the final gas-liquid separator and pumping said solvent into the other separation vessels countercurrent to the gas flow.

* * * * *